(12) United States Patent
Morgan et al.

(10) Patent No.: US 9,456,401 B2
(45) Date of Patent: Sep. 27, 2016

(54) METHOD FOR ENHANCING DATA TRANSFER ACROSS A WIRELESS NETWORK ARRANGEMENT

(71) Applicant: Texecom Limited, Lancashire (GB)

(72) Inventors: Reuben Morgan, Manchester (GB); Peter Alexander, Manchester (GB)

(73) Assignee: TEXECOM LIMITED, Haslingden, Lancashire (GB)

( * ) Notice: Subject to any disclaimer, the term of this patent is extended or adjusted under 35 U.S.C. 154(b) by 0 days.

(21) Appl. No.: 14/355,563

(22) PCT Filed: Nov. 13, 2012

(86) PCT No.: PCT/EP2012/072478
§ 371 (c)(1),
(2) Date: Apr. 30, 2014

(87) PCT Pub. No.: WO2013/072302
PCT Pub. Date: May 23, 2013

(65) Prior Publication Data
US 2015/0117282 A1    Apr. 30, 2015

(30) Foreign Application Priority Data

Nov. 15, 2011 (GB) .................................. 1119698.7

(51) Int. Cl.
*H04L 12/26* (2006.01)
*H04W 40/18* (2009.01)
(Continued)

(52) U.S. Cl.
CPC ........... *H04W 40/18* (2013.01); *H04W 40/005* (2013.01); *H04W 52/0209* (2013.01); *H04W52/0216* (2013.01); *H04W 52/0219* (2013.01); *H04L 45/34* (2013.01); *H04W 84/18* (2013.01); *Y02B 60/50* (2013.01)

(58) Field of Classification Search
CPC ............... H04W 88/06; H04W 40/22; H04W 52/0216; H04L 12/12; H04L 12/66; H04L 41/0823; H04L 45/00
USPC .......................................... 370/328, 329, 235
See application file for complete search history.

(56) References Cited

U.S. PATENT DOCUMENTS 6,148,344 A * 11/2000 Bi ....................... H04L 12/4625
                                               370/466
6,195,555 B1 * 2/2001 Dent ................... H04B 7/18545
                                               342/350

(Continued)

FOREIGN PATENT DOCUMENTS

| CN | 101682541 A | 3/2010 |
|---|---|---|
| EP | 2140617 A2 | 6/2010 |
| WO | 2009008934 A2 | 1/2009 |

OTHER PUBLICATIONS

Du S et al: RMAC: A Routing-Enhancing Duty-Cycle MAC Protocol for Wireless Sensor Networks: Infocom 2007. 26th IEEE International Conference on Computer Communications. IEEE, IEEE, PI, May 1, 2007, pp. 1478-1486, XP031093710, DOI: 10.1109/Infocom.207.174, ISBN: 978-1-4244-1047-7, Chapters II. and III.

*Primary Examiner* — Dang Ton
*Assistant Examiner* — Sai Aung
(74) *Attorney, Agent, or Firm* — Barlow, Josephs & Holmes, Ltd.

(57) ABSTRACT

A method of route prediction and device configuration for enhancing data transfer across a wireless network arrangement by using routing information to predict data transfer routes and configuring devices to switch between states to reduce data transference time and power consumption of a wireless network arrangement.

8 Claims, 1 Drawing Sheet

(51) Int. Cl.
  *H04W 40/00* (2009.01)
  *H04W 52/02* (2009.01)
  *H04W 84/18* (2009.01)
  *H04L 12/721* (2013.01)

(56) References Cited

U.S. PATENT DOCUMENTS 6,804,201 B1  10/2004  Gelenbe
9,025,457 B2 *  5/2015  Yamaguchi ........... G06F 1/3206
                                                      370/235
2008/0279138 A1 *  11/2008  Gonikberg ............ H04W 8/005
                                                      370/328
2009/0046732 A1 *  2/2009  Pratt, Jr. ................. H04L 12/66
                                                      370/406
2011/0216656 A1  9/2011  Pratt
2012/0075995 A1 *  3/2012  Welin ...................... H04L 12/12
                                                      370/235
2012/0120857 A1 *  5/2012  Sudak ............... H04W 52/0216
                                                      370/311

* cited by examiner

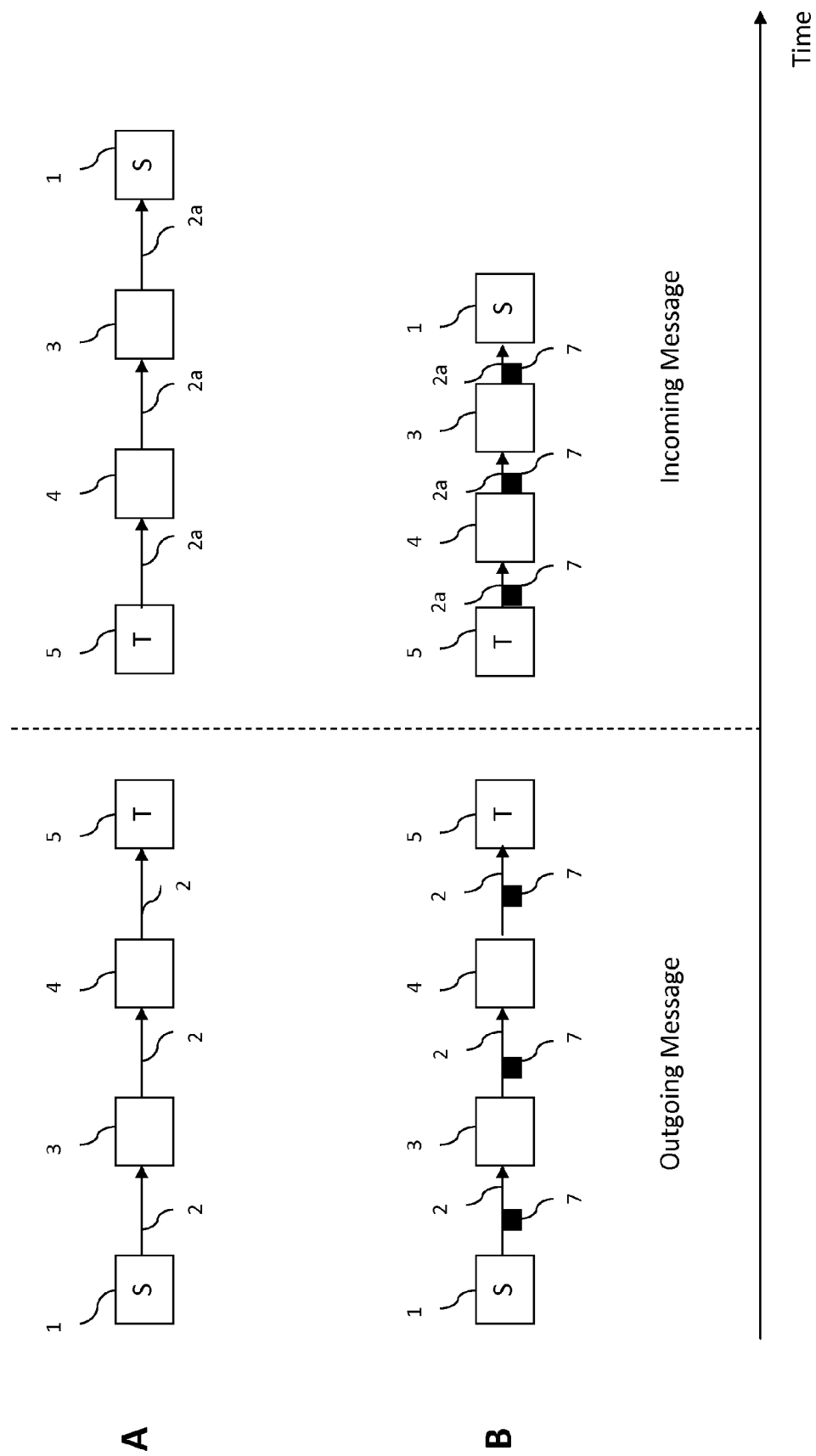

METHOD FOR ENHANCING DATA TRANSFER ACROSS A WIRELESS NETWORK ARRANGEMENT

The present invention relates to a method of route prediction and device configuration for enhancing data transfer across a wireless network arrangement and in particular, across a wireless mesh network arrangement.

Wireless mesh network arrangements comprise a plurality of devices that are capable of data communication, so as to transfer messages between a starting device and a target device, usually via at least one intermediate device.

It is important, particularly for safety critical systems, that said starting device receives an acknowledgement that the target device has successfully received a message.

Whilst existing wireless network arrangements may provide a form of acknowledgement to the starting device that a message has been received, typically the incoming (reply) message is routed according to standard methods of device signalling and selection. For example, the incoming message may be routed through the intermediate devices used to transmit the outgoing message, or said incoming message may be routed through the intermediate devices that are first to pick up the transmitted message.

This standard method of device signalling and selection typically results it taking approximately the same amount of time to transfer an incoming (reply) message as it takes to transmit an outgoing message, between a starting device and a target device as the route is unpredicted. This method of unpredicted routing therefore offers no saving in time or power efficiency with regard to the transmission of incoming (reply) messages.

Accordingly, it is an object of the present invention to provide a method of route prediction and device configuration for data transfer that reduces the power consumption of a wireless mesh network arrangement, most preferably to the extent that said mesh network arrangement may be suitable for constantly supervised battery powered applications.

A further object of the present invention is to provide a method of route prediction and device configuration for data transfer across a wireless network arrangement, that minimises the time taken to transmit messages between devices, thus minimising the time taken to transmit data throughout the entire wireless system.

It is a yet further object of the present invention to provide a method of route prediction and device configuration that can be incorporated into an existing wireless network arrangement to enhance the speed and efficiency of data transfer within said network arrangement.

Thus and in accordance with the present invention there is provided a method of route prediction and device configuration for data transfer across a wireless network arrangement comprising retrieving routing information derived from successful data transfer routes, using said routing information to predict subsequent data transfer routes and using said predictions to configure network devices to switch between an active state and a de-active state and also between a transmitting mode and a receiving mode whilst in said active state, to reduce data transference time and power consumption of a wireless network arrangement.

Preferably, the method of route prediction and device configuration for data transfer, hereinafter referred to as the method of predicted routing, comprises a means of sending and receiving data between devices within a network arrangement, including but not limited to a wireless mesh network arrangement.

The method of predicted routing preferably comprises a means of configuring devices to be capable of receiving and sending data, based on a prediction that said devices will be subsequently required for data communication.

Said prediction may be based on routing information derived from previously successful data communication routes within said network arrangement.

Preferably, the method of predicted routing comprises a means of retrieving routing information derived from previously successful communications within the wireless network arrangement, from a sending device, target device and/or other wireless network devices.

The method of predicted routing preferably comprises a means of establishing alternative communication pathways within a network arrangement, which may be utilised for example, if a predicted communication pathway becomes unviable for effective data transfer.

The method of predicted routing therefore preferably allows multiple data transfer routes to be established within the network arrangement, whilst still maintaining the increase in speed and efficiency of data transfer afforded by said method.

Most preferably, said method of predicted routing comprises a means of acknowledgement of data transfer, which may comprise the routing information, in order that a network arrangement may be capable of "learning" successful communication routes.

Most preferably, said method of predicted routing is further capable of using said routing information to anticipate when a device within a network arrangement will be required to receive and transmit data and most preferably, uses said routing information to predict the incoming (reply) route by ensuring that said required device is ready to receive and subsequently transmit if necessary, a message from another device within the network arrangement at a required time, thus reducing the time taken for the incoming (reply) message to be transmitted compared to the outgoing message.

Preferably, said method of predicted routing may be capable of configuring devices to remain capable of detecting and responding to messages or signals sent by other devices within the wireless network arrangement and also independently assess their requirement for participation in data transfer and respond accordingly. For example, if a device concludes, on the basis of the routing information that it receives that it is part of a predicted route, said device may "wake up" (active state) to participate in data transfer or return to a "sleep-mode" (de-active state) if they are not required, thus reducing power consumption of the wireless network arrangement.

The method of predicted routing may be applied to any wireless communication arrangement, including but not limited to security systems and gas detection systems.

The invention will now be described further by way of example only and with reference to the drawing in which;

FIG. 1 shows a schematic diagram of an example of a traditional method "A" of data communication and the predicted method "B" of data communication across a wireless network arrangement, in accordance with the present invention.

Referring now to FIG. 1, method A shows the relative timescale of an outgoing message transmission 2 between a starting device (S) 1 and a target device (T) 5 via intermediate devices 3 and 4 respectively, based on a standard device signalling and selection method that utilises unpredicted routing.

It is to be appreciated that by target device, it is meant any device which is intended to be the final recipient of the message and may include but not be limited to a control panel or gas detection device.

When a target device 5 receives the outgoing message 2 from the starting device 1 via the intermediate devices 3, 4, it then transmits a response 2a back to the starting device 1, via intermediate devices 3, 4, based on what is perceived by the network system to be the most appropriate route.

The most appropriate route may be based on one or more factors depending on the configuration of the wireless network arrangement, such as for example a message may be transmitted to a particular device based on a high signal strength or proximity.

Receipt of the incoming (reply) message 2a by the starting device 1 also serves as an acknowledgement that the message was successfully transmitted to the target device 5.

As the route of the incoming message 2a is determined by an unpredicted and standard device signalling and selection method, it typically takes as long for the incoming message 2a to be transmitted as it does for the outgoing message 2 to be transmitted, thus there are no time and efficiency savings made during incoming message 2a transmission.

Referring now to method B, the predicted routing method in accordance with the present invention is schematically illustrated. The starting device 1, comprising a memory device (not shown), retrieves routing information 7 from said memory device (not shown), said routing information 7 being compiled from data relating to previously successful data transmissions within the wireless network arrangement.

Each device within the wireless network arrangement is able to quickly assess the routing information 7 upon receipt, to determine whether they are required to participate in message transmission or not.

If a device is required to actively participate in data transfer, said device "wakes" (i.e. switches to an "active" state), to receive the message and subsequently pass said message on to a further device. If a device is not required to participate, then said device simply returns to "sleep-mode" (de-active state) thus conserving power.

This feature of the method means that only devices that are actually required for data communication in accordance with the routing information 7, are powered up in a fully active state. Devices that are not required for data communication according to the routing information 7 remain in "sleep-mode" and thus consume only a negligible amount of power. It will be appreciated that this feature of the method reduces the overall power consumption of the wireless network arrangement.

Said routing information 7 is transmitted as a component of the outgoing message 2, which is transmitted to the target device 5 via intermediate devices 3, 4. As the target device 5 has received the routing information 7, the incoming (reply) message 2a is transmitted back to the starting device 1 via a predicted route.

As the route of data transfer is predicted, devices participating in the incoming message 2a transfer are configured by the method to change their attributes in anticipation of receipt of said incoming message 2a, such that they remain in an active state until they receive and subsequently transfer the message 2a to a further device. The devices involved in data transfer therefore effectively behave differently and more efficiently during incoming message 2a transmission, as compared to during outgoing message 2 transmission.

The method of device configuration therefore increases the speed and efficiency with which the incoming message 2a may be transmitted, as illustrated in FIG. 1, route B. It is to be appreciated that the time indication given in FIG. 1 is arbitrary and not a specific indication of the relative speeds of data transfer according to each method.

It is further to be appreciated that in the present arrangement, devices are always capable of detecting and responding to messages if necessary, such as for example in the event that a predicted route fails and the network arrangement is required to find an alternative communication pathway.

It is anticipated that the method of route prediction and device configured as described herein may be used to enhance the speed and efficiency of data transfer across any network arrangement, without the requirement to replace existing network hardware or architecture.

It is of course to be appreciated that the invention is not to be restricted to the details of embodiments described above which are described by way of example only.

The invention claimed is:

1. A method of wirelessly transferring data across a network between a sending network device (1) and a target network device (5) via one or more intermediate network devices (3, 4), collectively "the devices" (1, 3, 4, 5), comprising the steps of:
   transmitting an outgoing message (2) from the sending device (1) to the target device (5) via one or more intermediate devices (3, 4);
   transmitting an incoming message (2a) from the target device (5) to the sending device (1) via one or more intermediate devices (3, 4);
   storing routing information (7) relating to the devices used to successfully transfer the outgoing (2) and incoming (2a) messages;
   incorporating the routing information (7) into a second outgoing message to specify a predicted route of intermediate devices intended to be used in the transmission of the second outgoing message so that only the intermediate devices intended to be used in the transfer of data switch to an active state for data communication on receipt of the second outgoing message; and
   configuring the intermediate devices used in the transmission of the second outgoing message from the sending device (1) to the target device (5) to remain in an active state until the intermediate devices receive and subsequently transfer an incoming message from the target device (5) to a further intermediate device along the predicted route to the sending device.

2. The method according to claim 1, further comprising:
   a means of sending and receiving data between the devices within the network arrangement including but not limited to a wireless mesh network arrangement.

3. The method according to claim 1, further comprising:
   a means of configuring the devices to be capable of receiving and sending data based upon the prediction that the devices will be subsequently required for data communication.

4. The method according to claim 1, comprising:
   a means of retrieving routing information derived from successful communications within the wireless network arrangement, from the sending device, target device and/or any other wireless network device.

5. The method according to claim 1, comprising:
   a means for establishing alternative communication pathways within a network arrangement which may be utilized if a predicted communication pathway become unviable for effective data transfer.

6. The method according to claim 5, comprising:
   a means for allowing multiple data transfer routes to be established within the network arrangement.

7. The method according to claim 1, wherein said method comprises the step of determining different successful communication routes.

8. The method according to claim 1, wherein said method is capable of allowing configuration of any of the devices in order that they may remain capable of detecting and responding to messages or signals sent by any other devices within the wireless network and further independently assess the requirement for participation in data transfer and responding accordingly.

\* \* \* \* \*